US012142879B2

(12) United States Patent
Maesoba et al.

(10) Patent No.: US 12,142,879 B2
(45) Date of Patent: Nov. 12, 2024

(54) ELECTRICAL CONNECTOR FOR A COAXIAL CABLE WITH MULTIPART SHIELD CONDUCTOR AND AN INNER CONDUCTOR AND DEVICE USING THE SAME

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Hiroyoshi Maesoba, Mie (JP); Toshifumi Ichio, Mie (JP)

(73) Assignees: AUTONETWORKS TECHNOLOGIES, LTD, Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 326 days.

(21) Appl. No.: 17/633,355

(22) PCT Filed: Jul. 22, 2020

(86) PCT No.: PCT/JP2020/028467
§ 371 (c)(1),
(2) Date: Feb. 7, 2022

(87) PCT Pub. No.: WO2021/029198
PCT Pub. Date: Feb. 18, 2021

(65) Prior Publication Data

US 2022/0302656 A1 Sep. 22, 2022

(30) Foreign Application Priority Data

Aug. 9, 2019 (JP) ................................ 2019-147189

(51) Int. Cl.
*H01R 13/6593* (2011.01)
*H01R 4/18* (2006.01)
(Continued)

(52) U.S. Cl.
CPC ......... *H01R 13/6593* (2013.01); *H01R 4/183* (2013.01); *H01R 13/6581* (2013.01);
(Continued)

(58) Field of Classification Search
CPC ................ H01R 13/6593; H01R 4/183; H01R 13/6581; H01R 13/6592; H01R 4/18;
(Continued)

(56) References Cited

U.S. PATENT DOCUMENTS

2010/0136832 A1 6/2010 Kawaguchi et al.
2015/0244085 A1 8/2015 Miyawaki
(Continued)

FOREIGN PATENT DOCUMENTS

JP 2568311 Y2 4/1998
JP 2011-228207 A 11/2011

OTHER PUBLICATIONS

International Search Report issued on Sep. 29, 2020 for WO 2021/029198 A1 (4 pages).

*Primary Examiner* — Justin M Kratt
(74) *Attorney, Agent, or Firm* — Venjuris, P.C.

(57) ABSTRACT

A connector in the present disclosure is a connector to be connected to a mating connector while being connected to a cable in which an outer periphery of a wire is covered with a shield body, and includes an inner conductor and an outer conductor. The inner conductor is connected to a core of a coated wire. The outer conductor includes a large-diameter tube portion, a small-diameter tube portion and a shield connecting portion. The shield connecting portion is connected to the shield body. The large-diameter tube portion is
(Continued)

formed into such a tubular shape that a tubular mating outer conductor provided in the mating connector is fittable thereinto. The small-diameter tube portion is formed into a tubular shape having a smaller diameter than the large-diameter tube portion and accommodates the inner conductor.

8 Claims, 11 Drawing Sheets

(51) Int. Cl.

| | |
|---|---|
| ***H01R 13/6581*** | (2011.01) |
| ***H01R 13/6592*** | (2011.01) |
| *H01R 13/42* | (2006.01) |
| *H01R 13/422* | (2006.01) |
| *H01R 13/424* | (2006.01) |
| *H01R 13/516* | (2006.01) |
| *H01R 13/6591* | (2011.01) |
| *H01R 103/00* | (2006.01) |

(52) U.S. Cl.
CPC ........... *H01R 13/6592* (2013.01); *H01R 4/18* (2013.01); *H01R 4/184* (2013.01); *H01R 13/42* (2013.01); *H01R 13/4223* (2013.01); *H01R 13/4226* (2013.01); *H01R 13/424* (2013.01); *H01R 13/516* (2013.01); *H01R 13/6591* (2013.01); *H01R 13/65912* (2020.08); *H01R 13/65914* (2020.08); *H01R 13/65917* (2020.08); *H01R 2103/00* (2013.01)

(58) Field of Classification Search
CPC .... H01R 4/184; H01R 13/42; H01R 13/4223; H01R 13/4226; H01R 13/424; H01R 13/516; H01R 13/6591; H01R 13/65912; H01R 13/65914; H01R 13/65917; H01R 2103/00
See application file for complete search history.

(56) References Cited

U.S. PATENT DOCUMENTS

| | | | | |
|---|---|---|---|---|
| 2018/0062280 | A1* | 3/2018 | Boyer ................ | H01R 13/6593 |
| 2019/0157809 | A1 | 5/2019 | Maesoba et al. | |

* cited by examiner

ELECTRICAL CONNECTOR FOR A COAXIAL CABLE WITH MULTIPART SHIELD CONDUCTOR AND AN INNER CONDUCTOR AND DEVICE USING THE SAME

CROSS REFERENCE TO RELATED APPLICATIONS

This application is a national phase of PCT application No. PCT/JP2020/028467, filed on 22 Jul. 2020, which claims priority from Japanese patent application No. 2019-147189, filed on 9 Aug. 2019, all of which are incorporated herein by reference.

TECHNICAL FIELD

The present disclosure relates to a connector and a connector device.

BACKGROUND

A shield connector connected to an end of a shielded cable in which a communication signal is transmitted is known from Japanese Patent Laid-Open Publication No. 2018-006183 (Patent Document 1). This shield connector is a male connector and includes a male inner conductor and an outer conductor surrounding the male inner conductor via a dielectric. Further, the male connector is connectable to a female connector. The female connector includes a female inner conductor and a female outer conductor surrounding the female inner conductor via a female dielectric. In connecting the male and female connectors, the outer conductor is externally fit to the female outer conductor to connect the outer conductor and the female outer conductor.

PRIOR ART DOCUMENT

Patent Document

Patent Document 1: JP 2018-006183 A

SUMMARY OF THE INVENTION

Problems to be Solved

Since the above male connector is so configured that the outer conductor is externally fit to the female outer conductor, a distance between the outer conductor and the male outer conductor is longer than a distance between the female outer conductor and the female inner conductor in the female connector. Thus, an impedance in the male connector is higher than that in the female connector and there is a concern for impedance mismatching between the male and female connectors.

A technique for suppressing the occurrence of impedance mismatching between connectors connectable to each other is disclosed in this specification.

Means to Solve the Problem

A connector of the present disclosure is a connector to be connected to a mating connector while being connected to a cable in which an outer periphery of a wire is covered with a shield body, and includes an inner conductor and an outer conductor, wherein the inner conductor is connectable to a mating inner conductor provided in the mating connector while being connected to a core of the wire, the outer conductor includes a large-diameter tube portion, a small-diameter tube portion and a shield connecting portion, the shield connecting portion is connected to the shield body, the large-diameter tube portion is formed into such a tubular shape that a tubular mating outer conductor provided in the mating connector is fittable thereinto, and the small-diameter tube portion is formed into a tubular shape having a smaller diameter than the large-diameter tube portion and accommodates the inner conductor.

Effect of the Invention

According to the present disclosure, it is possible to suppress the occurrence of impedance mismatching between connectors connectable to each other.

DETAILED DESCRIPTION TO EXECUTE THE INVENTION

Description of Embodiments of Present Disclosure

Figure 1:
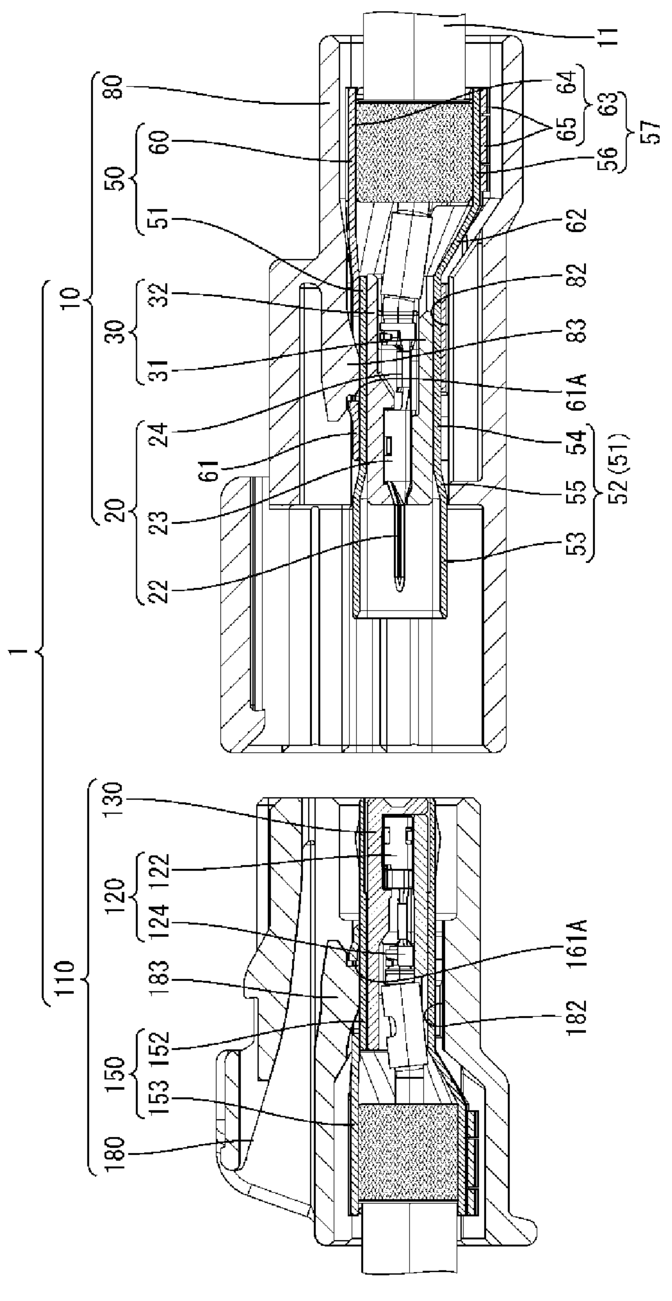
FIG. 1 is a section showing a state before a male connector and a female connector according to a first embodiment are connected.

First, embodiments of the present disclosure are listed and described.

(1) A connector to be connected to a mating connector while being connected to a cable in which an outer periphery of a wire is covered with a shield body includes an inner conductor and an outer conductor, wherein the inner conductor is connectable to a mating inner conductor provided in the mating connector while being connected to a core of the wire, the outer conductor includes a large-diameter tube portion, a small-diameter tube portion and a shield connecting portion, the shield connecting portion is connected to the shield body, the large-diameter tube portion is formed into such a tubular shape that a tubular mating outer conductor provided in the mating connector is fittable thereinto, and the small-diameter tube portion is formed into a tubular shape having a smaller diameter than the large-diameter tube portion and accommodates the inner conductor.

Since the inner conductor is accommodated in the small-diameter tube portion formed to have a smaller diameter than the large-diameter tube portion although the mating outer conductor is fit in the large-diameter tube portion, a distance between the inner conductor and the small-diameter tube portion can be made shorter than a distance between the inner conductor and the large-diameter tube portion fit to the mating outer conductor. That is, by approximating the distance between the inner conductor and the small-diameter tube portion to a distance between the mating inner conductor and the mating outer conductor, the occurrence of impedance mismatching between the mating connector and the connector after the connection of the mating connector and the connector can be suppressed.

(2) The small-diameter tube portion and the mating outer conductor are formed to have the same diameter. That the small-diameter tube portion and the mating outer conductor have the same diameter means a case where a radial dimension of the small-diameter tube portion and that of the mating outer conductor are equal and a case where the radial dimension of the small-diameter tube portion and that of the mating outer conductor can be regarded as substantially equal even if not being equal.

Since the small-diameter tube portion and the mating outer conductor have the same diameter, the occurrence of impedance mismatching between the mating connector and the connector after the connection of the mating connector and the connector can be further suppressed.

(3) The small-diameter tube portion is connected to an end part of the large-diameter tube portion on a side opposite to the mating connector.

Since the large-diameter tube portion and the small-diameter tube portion are connected and integrated, the number of components can be reduced as compared to the case where the large-diameter tube portion and the small-diameter tube portion are separately configured. In this way, the assembling workability of the connector can be improved.

(4) The outer conductor is composed of a first outer conductor and a second outer conductor to be assembled with the first outer conductor, the first outer conductor includes the large-diameter tube portion and the small-diameter tube portion, the second outer conductor includes the shield connecting portion and a covering portion for covering an outer periphery of the small-diameter tube portion, and the covering portion and the large-diameter tube portion are formed to have the same diameter. That the covering portion and the large-diameter tube portion have the same diameter means a case where a radial dimension of the covering portion and that of the large-diameter tube portion are equal and a case where the radial dimension of the covering portion and that of the large-diameter tube portion can be regarded as substantially equal even if not being equal.

That is, since the covering portion for covering the small-diameter tube portion having a smaller diameter than the large-diameter tube portion and the large-diameter tube portion have the same diameter, the enlargement of the build of the outer conductor and, consequently, the build of the connector can be suppressed, for example, as compared to the case where the small-diameter tube portion is not provided and the covering portion has a larger diameter than the large-diameter tube portion.

(5) The small-diameter tube portion is formed separately from the large-diameter tube portion and arranged in the large-diameter tube portion.

Only by arranging the small-diameter tube portion separate from the large-diameter tube portion in the large-diameter tube portion, the distance between the inner conductor and the small-diameter tube portion can be made shorter. In this way, the occurrence of impedance mismatching between the mating connector and the connector after the connection of the mating connector and the connector can be suppressed.

(6) The small-diameter tube portion is formed separately from the large-diameter tube portion, and a part of the small-diameter tube portion is fit into the large-diameter tube portion.

By fitting the mating outer conductor and the part of the small-diameter tube portion into the large-diameter tube portion, the small-diameter tube portion and the mating outer conductor have substantially the same diameter. Thus, the occurrence of impedance mismatching between the mating connector and the connector after the connection of the mating connector and the connector can be suppressed.

(7) A connector device of the present disclosure includes the above connector and the above mating connector.

Details of Embodiments of Present Disclosure

Specific examples of a connector of the present disclosure are described below with reference to the drawings. Note that the present disclosure is not limited to these illustrations and is intended to be represented by claims and include all changes in the scope of claims and in the meaning and scope of equivalents.

First Embodiment

A first embodiment in the present disclosure is described with reference to FIGS. 1 to 7.

In this embodiment, a connector device 1 for communication is illustrated which is installed, for example, in a vehicle such as an automotive vehicle and disposed in a wired communication path between an in-vehicle electrical component (car navigation system, ETC, monitor, etc.) in the vehicle and an external device (camera, etc.) or between in-vehicle electrical components.

Connector Device 1

Figure 2:
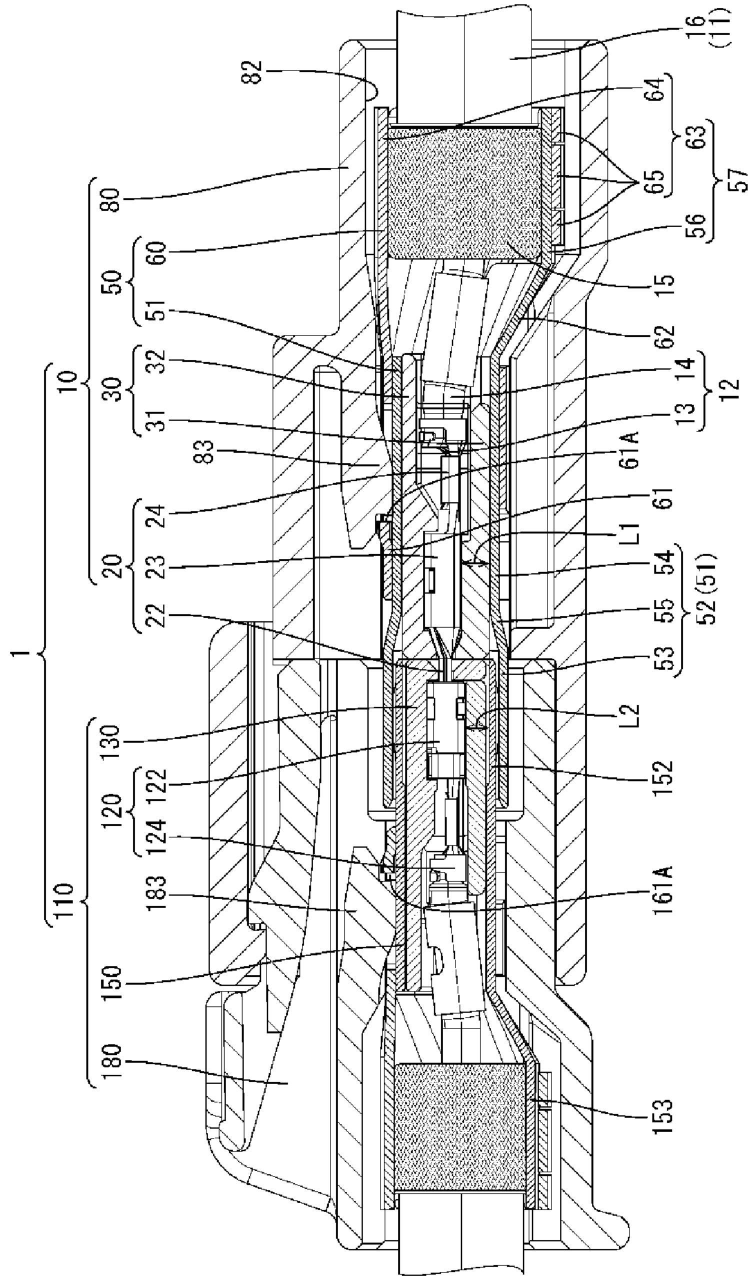
FIG. 2 is a section showing a state after the male and female connectors are connected.

As shown in FIGS. 1 and 2, the connector device 1 includes a female connector (an example of a "mating connector") 110 and a male connector (an example of a "connector") 10 connectable to each other while being connected to cables 11. In the following description, a vertical direction is based on a vertical direction in FIGS. 1 and 2 and sides to be connected to each other with respect to a connecting direction of the female connector 110 and the male connector 10 are referred to as front sides concerning a front-rear direction.

Cable 11

Figure 4:
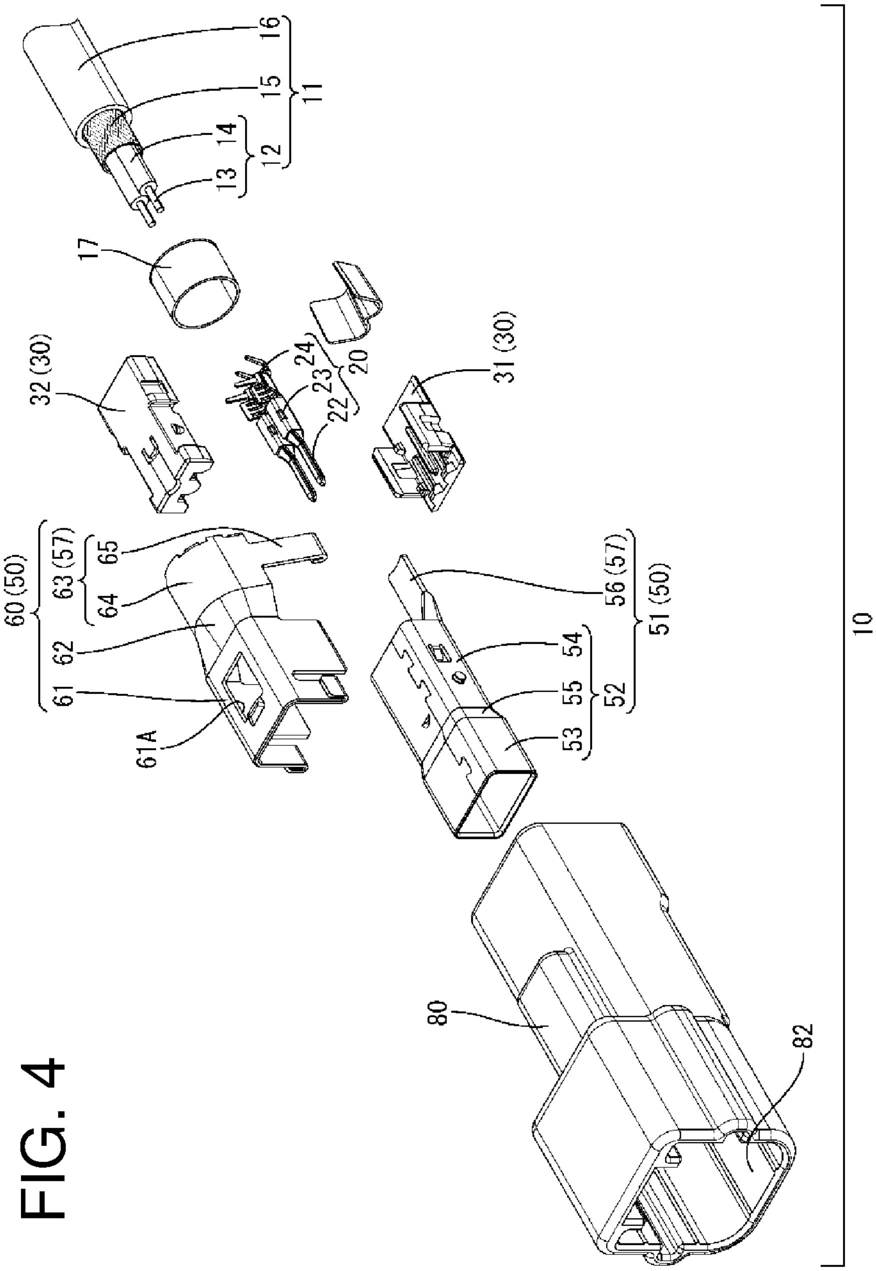
FIG. 4 is an exploded perspective view of the male connector.
Figure 5:
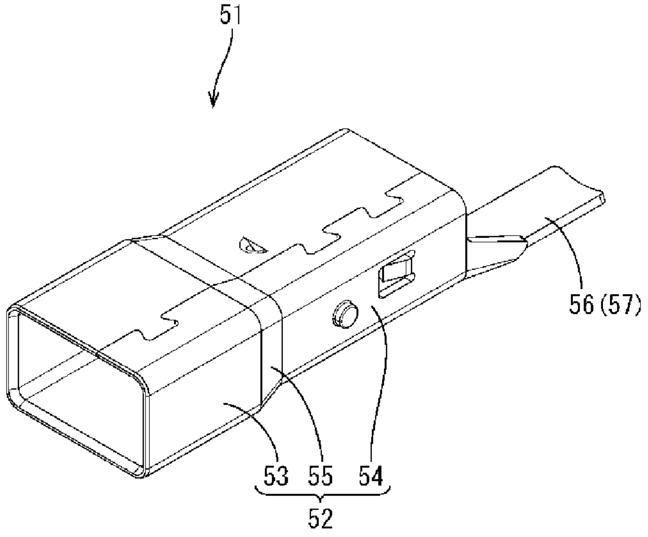
FIG. 5 is a perspective view of a first outer conductor.
Figure 6:
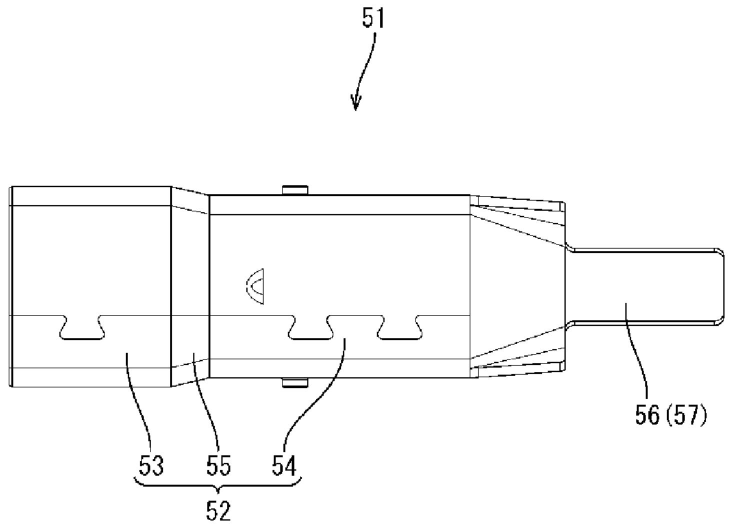
FIG. 6 is a plan view of the first outer conductor.
Figure 7:
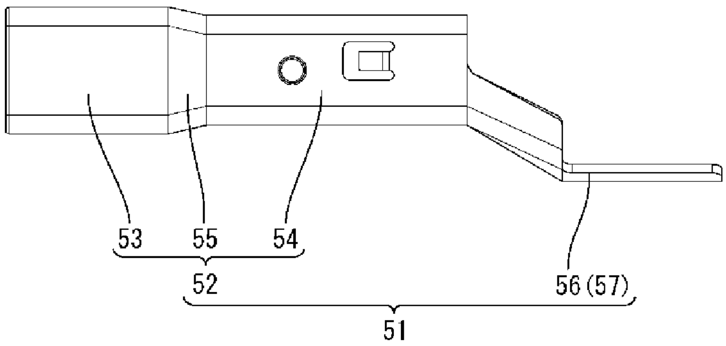
FIG. 7 is a side view of the first outer conductor.

As shown in FIGS. 1, 2 and 4, the cable 11 includes two coated wires (example of a wire) 12, a shield body 15 constituted by a braided wire for collectively covering the outer peripheries of the coated wires 12, and a sheath 16 constituted by an insulating coating for covering the outer periphery of the shield body 15.

In a front end of the cable 11, the sheath 16 and the shield body 15 are stripped and the two coated wires 12 are exposed from ends of the sheath 16 and the shield body 15.

The shield body 15 exposed form the end of the sheath 16 is folded onto an end part of the sheath 16 behind the exposed coated wires 12 in the cable 11.

A sleeve 17 made of metal is arranged inside the shield body 15 folded onto the end part of the sheath 16. The sleeve 17 is formed into a hollow cylindrical shape by processing a metal plate material.

Female Connector 110

As shown in FIGS. 1 and 2, the female connector 110 includes a plurality of female inner conductors (an example of a "mating inner conductor") 120 to be connected to the two coated wires 12 exposed in the front end part of the cable 11, a female dielectric 130 for accommodating the plurality of female inner conductors 120, a female outer conductor (an example of a "mating outer conductor") 150 to be connected to the shield body 15 while covering the female dielectric 130, and a female housing 180 for accommodating the female outer conductor 150.

Female Inner Conductors 120

The female inner conductor 120 is formed by processing a conductive metal plate material. As shown in FIGS. 1 and 2, the female inner conductor 120 includes a terminal connecting portion 122 in the form of a rectangular tube and a wire connecting portion 124 connected behind the terminal connecting portion 122.

The terminal connecting portion 122 is electrically connected to an inner conductor 20 of the male connector 10 to be described later. The wire connecting portion 124 is electrically connected to the coated wire 12 by being crimped to a core 13 and an insulation coating 14 exposed in a front end part of the coated wire 12.

Female Dielectric 130

As shown in FIGS. 1 and 2, the dielectric 130 is formed of insulating synthetic resin into a rectangular parallelepiped shape long in the front-rear direction. The dielectric 130 is formed by assembling two members with each other in the vertical direction.

Figure 3:
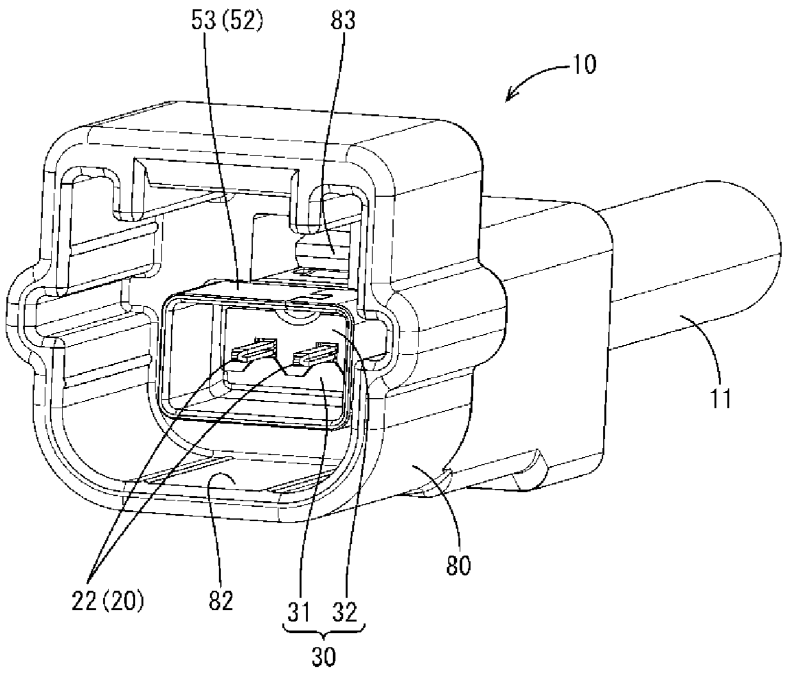
FIG. 3 is a perspective view of the male connector.

As shown in FIGS. 2 and 3, two female inner conductors 120 connected to the coated wires 12 are accommodated side by side in a lateral direction inside the female dielectric 130.

Female Outer Conductor 150

The female outer conductor 150 is formed by processing a conductive metal plate material and formed by assembling two members.

As shown in FIGS. 1 and 2, the female outer conductor 150 includes a tubular connecting portion 152 fittable to an outer conductor 50 of the male connector 10 to be described later and a shield connecting portion 153 to be connected to the shield body 15 of the cable 11.

The tubular connecting portion 152 is in the form of a rectangular tube long in the front-rear direction. The female dielectric 130 can be accommodated into the tubular connecting portion 152 from behind. When the female dielectric 130 is accommodated into the tubular connecting portion 152, the female inner conductors 120 are accommodated while being electrically insulated from the tubular connecting portion 152 by the female dielectric 130 as shown in FIGS. 1 and 2.

The shield connecting portion 153 is formed in a rear end part of the female outer conductor 150. As shown in FIGS. 1 and 2, the shield connecting portion 153 is crimped to the outer periphery of the shield body 15 folded in the cable 11. In this way, the female outer conductor 150 is electrically connected to the shield body 15.

Female Housing 180

The female housing 180 is made of insulating synthetic resin and includes, as shown in FIGS. 1 and 2, an outer conductor accommodating portion 182 for accommodating the female outer conductor 150 inserted from behind.

The outer conductor accommodating portion 182 is formed to penetrate in the front-rear direction. A locking lance 183 to be fit into a lance hole 161A provided in the female outer conductor 150 is provided in the outer conductor accommodating portion 182.

When the female outer conductor 150 is accommodated to a proper accommodation position in the outer conductor accommodating portion 182, the locking lance 183 is fit into the lance hole 161A as shown in FIGS. 1 and 2. Thus, the female outer conductor 150 is held in the female housing 180 by locking the locking lance 183 and an edge part of the lance hole 161A.

Male Connector 10

As shown in FIGS. 1 and 2, the male connector 10 includes a plurality of the inner conductors 20 to be connected to two coated wires 12 exposed in a front end part of the cable 11, a dielectric 30 for accommodating the plurality of inner conductors 20, the outer conductor 50 to be connected to the cable 11 while covering the dielectric 30, and a housing 80 for accommodating the outer conductor 50.

Inner Conductors 20

The inner conductor 20 is formed as a male inner conductor by processing a conductive metal plate material. As shown in FIGS. 1, 2 and 4, the inner conductor 20 includes a pin-shaped male connecting portion 22, a box portion 23 in the form of a rectangular parallelepiped connected to a rear end part of the male connecting portion 22 and long in the front-rear direction, and a wire connecting portion 24 connected behind the box portion 23.

The male connecting portion 22 is electrically connected to the female inner conductor 120 by entering the terminal connecting portion 122 of the female inner conductor 120 of the female connector 110 from front as shown in FIG. 2.

The wire connecting portion 24 is electrically connected to the coated wire 12 by being crimped to a core 13 and an insulation coating 14 exposed in a front end part of the coated wire 12.

Dielectric 30

As shown in FIG. 4, the dielectric 30 is formed of insulating synthetic resin into a rectangular parallelepiped shape long in the front-rear direction. The dielectric 30 is formed by assembling a lower dielectric 31 and an upper dielectric 32 with each other in the vertical direction.

As shown in FIG. 3, two inner conductors 20 connected to the coated wires 12 are accommodated to be sandwiched from both vertical sides by the lower and upper dielectrics 31, 32 while being arranged side by side in the lateral direction. When the inner conductor 20 is accommodated into the dielectric 30, the male connecting portion 22 projects from the front wall of the dielectric 30.

Outer Conductor 50

The outer conductor 50 is fittable and connectable to the female outer conductor 150 of the female connector 110. As shown in FIGS. 1, 2 and 4, the outer conductor 50 is composed of a first outer conductor 51 for accommodating the dielectric 30 inside and a second outer conductor 60 to be assembled with the first outer conductor 51 to cover the outer peripheries of the first outer conductor 51 and the shield body 15 of the cable 11.

First Outer Conductor 51

The first outer conductor 51 is formed by processing a conductive metal plate material. As shown in FIGS. 4 to 7, the first outer conductor 51 includes a connecting tube portion 52 in the form of a rectangular tube substantially rectangular in a front view and a first shield connecting portion 56 provided on the rear end edge of a lower side of the connecting tube portion 52.

As shown in FIG. 2, a front part of the connecting tube portion 52 serves as a large-diameter tube portion 53 into which the tubular connecting portion 152 of the female outer conductor 150 of the female connector 110 is fit. A rear end edge part of the large-diameter tube portion 53 serves as a tapered portion 55 having a tapered shape to be inclined toward an axial center toward a rear side. A part of the connecting tube portion 52 behind the tapered portion 55 serves as a small-diameter tube portion 54 arranged coaxially with the large-diameter tube portion 53 and having a diameter a size smaller than the large-diameter tube portion 53.

As shown in FIGS. 1 and 2, the small-diameter tube portion 54 is formed to have the same diameter as the tubular connecting portion 152 of the female outer conductor 150. Here, that the small-diameter tube portion 54 and the tubular connecting portion 152 have the same diameter means a case where the small-diameter tube portion 54 and the tubular connecting portion 152 have an equal diameter and a case where the small-diameter tube portion 54 and the tubular connecting portion 152 can be regarded to have a substantially equal diameter even if not having an equal diameter. Therefore, the connecting tube portion 52 is narrower from a central part to a rear part than in a front part as shown in FIGS. 1, 2 and 4 to 7.

The dielectric 30 can be accommodated into the connecting tube portion 52 from behind. When the dielectric 30 is accommodated into the connecting tube portion 52 from behind, parts of the inner conductors 20 behind the box portions 23 are accommodated while being electrically insulated from the small-diameter tube portion 54 by the dielectric 30 and the male connecting portions 22 are arranged in the large-diameter tube portion 53 while projecting from the dielectric 30 as shown in FIGS. 1 and 2.

Further, when the dielectric 30 is accommodated into the connecting tube portion 52 from behind, a distance L1 between the small-diameter tube portion 54 and the box portions 23 is shorter than a distance between the large-diameter tube portion 53 and the male connecting portions 22 and equal to a distance L2 between the terminal connecting portions 122 of the female inner conductors 120 and the female outer conductor 150 as shown in FIG. 2. Here, that the distances L1 and L2 are equal means a case where the distances L1, L2 are equal and a case where the distances L1, L2 can be regarded as substantially equal even if not being equal.

The first shield connecting portion 56 is in the form of a plate extending rearward from a lower end part of the connecting tube portion 52. As shown in FIGS. 1 and 2, the first shield connecting portion 56 is arranged below the shield body 15 in the cable 11.

Second Outer Conductor 60

The second outer conductor 60 is formed by processing a conductive metal plate material. As shown in FIGS. 1, 2 and 4, the second outer conductor 60 includes a covering portion 61 to be mounted on the outer periphery of the small-diameter tube portion 54, a second shield connecting portion 63 to be crimped to the outer periphery of the shield body 15 and a linking portion 62 linking the covering portion 61 and the second shield connecting portion 63.

The covering portion 61 is wound on the outer peripheral surface of the small-diameter tube portion 54 to surround the outer peripheral surface of the small-diameter tube portion 54. When being mounted on the outer peripheral surface of the small-diameter tube portion 54, the covering portion 61 is formed to have the same diameter as the large-diameter tube portion 53 as shown in FIGS. 1 and 2. Here, that the covering portion 61 and the large-diameter tube portion 53 have the same diameter means a case where the covering portion 61 and the large-diameter tube portion 53 have an equal diameter and a case where the covering portion 61 and the large-diameter tube portion 53 can be regarded to have a substantially equal diameter even if not having an equal diameter. A through hole 61A into which a terminal locking portion 83 of the housing 80 to be described later is fit is formed to penetrate through an upper part of the covering portion 61 in the vertical direction.

As shown in FIGS. 1 and 2, the second shield connecting portion 63 is electrically connected and fixed to the shield body 15 by being crimped to the outer periphery of the shield body 15 folded in the cable 11. That is, the second shield connecting portion 63 is configured, together with the first shield connecting portion 56, as a shield connecting portion 57 to be connected to the shield body 15 of the cable 11.

The second shield connecting portion 63 includes a hollow cylindrical hollow semicylindrical upper plate 64 for covering an upper half of the shield body 15 and a plurality of crimping pieces 65 provided on both lateral side edges of the upper plate 64. The plurality of crimping pieces 65 extend straight obliquely downward from the both lateral side edges of the upper plate 64 to be separated from each other as shown in FIG. 4 in a state before the second outer conductor 60 is assembled with the first outer conductor 51. The plurality of crimping pieces 65 are crimped and fixed to wind around the shield body 15 together with the first shield connecting portion 56 arranged below the shield body 15 as shown in FIGS. 1 and 2 when the second outer conductor 60 is assembled with the first outer conductor 51.

Housing 80

The housing 80 is made of synthetic resin and includes an accommodating portion 82 for accommodating the outer conductor 50 inserted from behind.

As shown in FIGS. 1 to 4, the accommodating portion 82 is formed to penetrate in the front-rear direction. The terminal locking portion 83 to be fit into the through hole 61A provided in the covering portion 61 is provided in the accommodating portion 82.

The terminal locking portion 83 is fit into the through hole 61A as shown in FIGS. 1 and 2 when the outer conductor 50 is accommodated to a proper accommodation position in the accommodating portion 82. Thus, the outer conductor 50 is held in the housing 80 by locking the terminal locking portion 83 and an edge part of the through hole 61A.

This embodiment is configured as described above. Next, functions and effects of the male connector 10 are described.

For example, if a tubular female outer conductor for accommodating a female inner conductor of a female connector is fit into a tubular outer conductor for accommodating an inner conductor of a male connector in a conventional connector device, the outer conductor is fit outside the female outer conductor. Thus, a distance between the outer conductor and the inner conductor in the male connector is longer than a distance between the female outer conductor and the female inner conductor in the female connector.

Then, after the male and female connectors are connected, an impedance in the male connector is higher than that in the female connector and there is a concern for impedance mismatching between the male and female connectors.

Accordingly, the present inventor and other researchers found out the configuration of this embodiment as a result of diligent study. That is, this embodiment relates to the male connector (connector) 10 to be connected to the female connector (mating connector) 110 while being connected to the cable 11 in which the outer peripheries of the coated wires (wire) 12 are covered with the shield body 15, and including the inner conductors 20 and the outer conductor 50. The inner conductor 20 is connectable to the female inner conductor (mating inner conductor) 120 provided in the female connector while being connected to the core 13 of the coated wire 12. The outer conductor 50 includes the large-diameter tube portion 53, the small-diameter tube portion 54 and the shield connecting portion 57, and the shield connecting portion 57 is connected to the shield body 15. As shown in FIGS. 1 and 2, the large-diameter tube portion 53 is formed into such a tubular shape that the tubular outer conductor (mating outer conductor) 150 provided in the female connector 110 is fittable thereinto, and the small-diameter tube portion 54 is formed into a tubular shape having a smaller diameter than the large-diameter tube portion 53 and accommodates the inner conductors.

Since the inner conductors 20 are accommodated in the small-diameter tube portion 54 formed to have a smaller diameter than the large-diameter tube portion 53 although the female outer conductor 150 is fit into the large-diameter tube portion 53, the distance between the inner conductors 20 and the small-diameter tube portion 54 can be made shorter than the distance between the inner conductors 20 and the large-diameter tube portion 53 into which the female outer conductor 150 is fit. That is, the distance between the inner conductors 20 and the small-diameter tube portion 54 can be approximated to the distance between the female inner conductors 120 and the female outer conductor 150 and the occurrence of impedance mismatching between the female and male connectors 110, 10 after the connection of the female and male connectors 110, 10 can be suppressed.

The small-diameter tube portion 54 and the female outer conductor 150 are formed to have the same diameter. Since the small-diameter tube portion 54 and the female outer conductor 150 have the same diameter, the distance between the inner conductors 20 and the small-diameter tube portion 54 can be made equal to the distance between the female inner conductors 120 and the female outer conductor 150. In this way, the occurrence of impedance mismatching between the female and male connectors 110, 10 after the connection of the female and male connectors 110, 10 can be further suppressed.

The small-diameter tube portion 54 is connected to a rear end part of the large-diameter tube portion 53 on a side opposite to the female connector 110. Since the large-diameter tube portion 53 and the small-diameter tube portion 54 are connected and integrated, the number of components can be reduced, for example, as compared to the case where a small-diameter tube portion and a large-diameter tube portion are separately configured. In this way, the assembling workability of the male connector can be improved.

The outer conductor 50 is composed of the first outer conductor 51 and the second outer conductor 60 to be assembled with the first outer conductor 51, the first outer conductor 51 includes the large-diameter tube portion 53 and the small-diameter tube portion 54, the second outer conductor 60 includes the shield connecting portion 57 and the covering portion 61 for covering the outer periphery of the small-diameter tube portion 54, and the covering portion 61 and the large-diameter tube portion 53 are formed to have the same diameter.

Since the covering portion 61 for covering the small-diameter tube portion 54 having a smaller diameter than the large-diameter tube portion 53 and the large-diameter tube portion 53 have the same diameter, the enlargement of the build of the outer conductor 50 and, consequently, the build of the male connector 10 can be suppressed, for example, as compared to the case where no small-diameter tube portion is provided and a covering portion has a larger diameter than a large-diameter tube portion.

Second Embodiment

Next, a second embodiment is described with reference to FIGS. 8 and 9.

An outer conductor 250 of a male connector 210 in the second embodiment is obtained by changing the shape of the first outer conductor 51 in the first embodiment and includes a third outer conductor 270, and components, functions and effects common to the first embodiment are not described to avoid repetitive description. Further, the same reference signs are used to denote the same components as those of the first embodiment.

Figure 8:
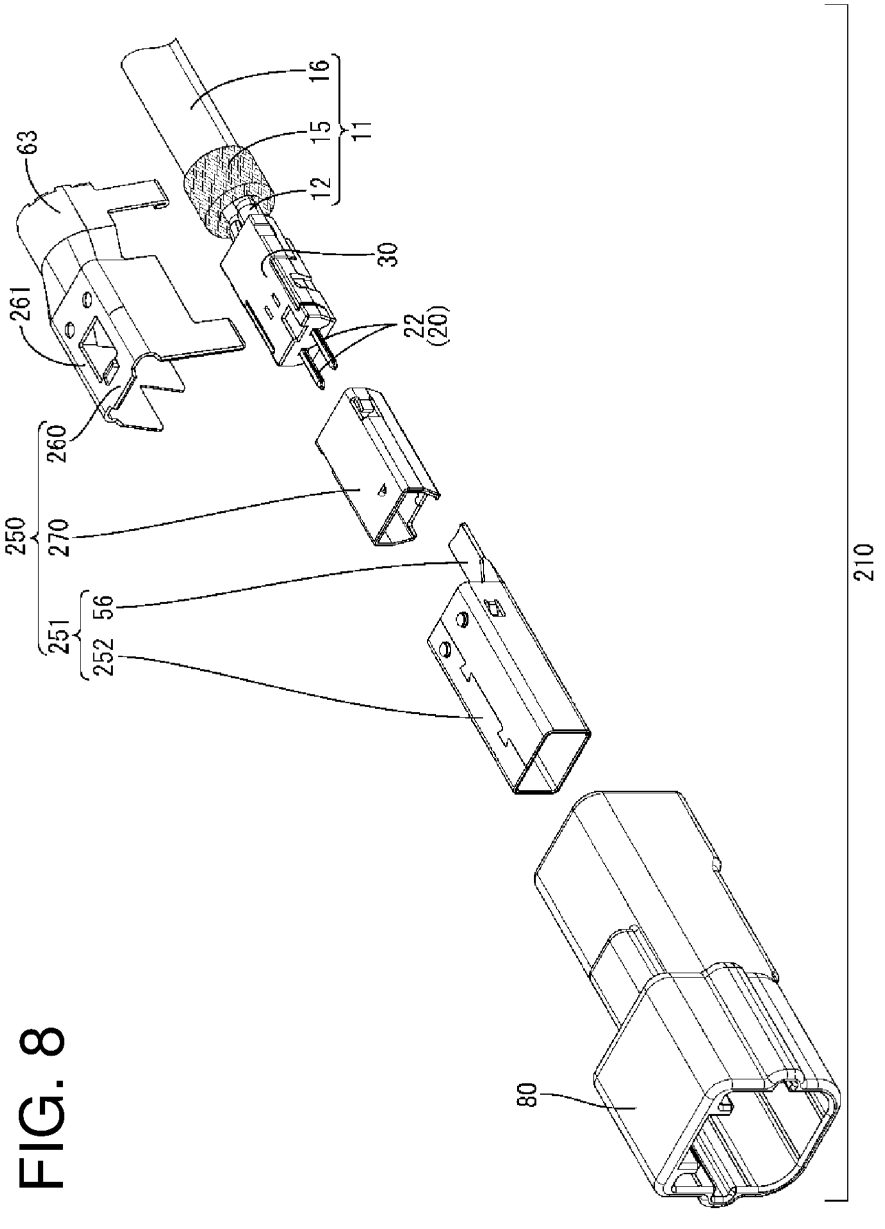
FIG. 8 is an exploded perspective view of a male connector according to a second embodiment.
Figure 9:
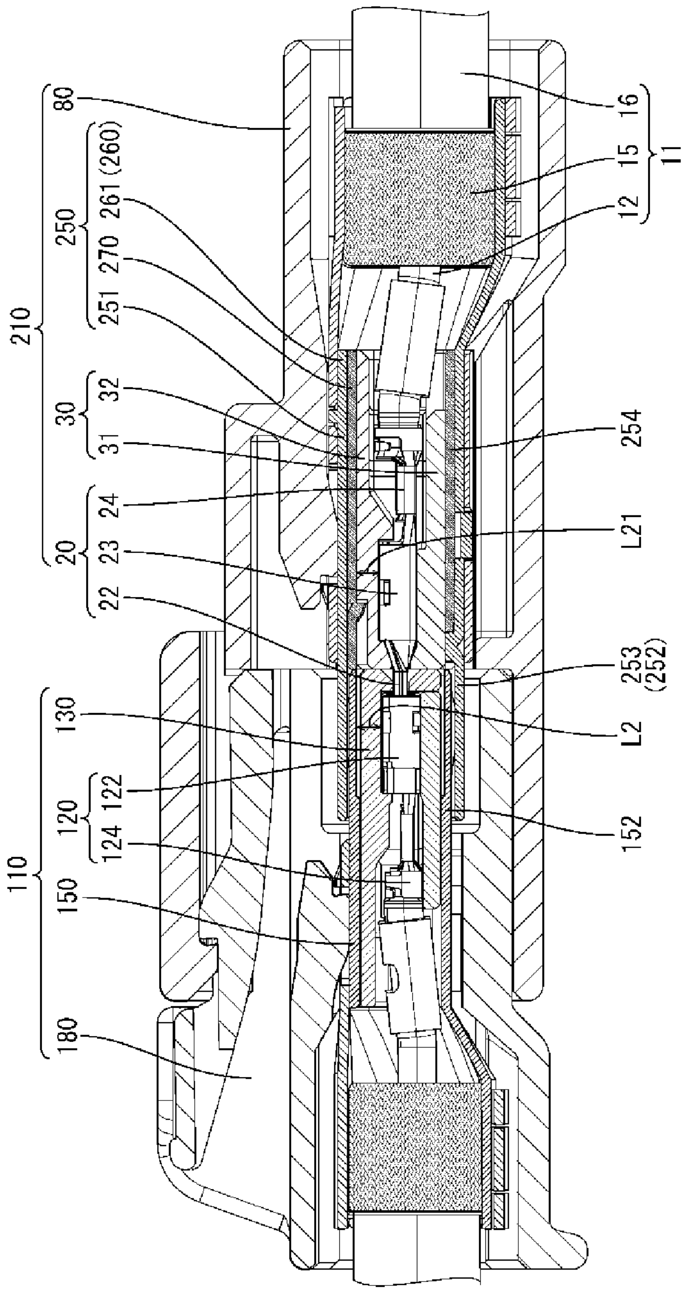
FIG. 9 is a section showing a state after the male connector and a female connector are connected.

As shown in FIGS. 8 and 9, the outer conductor 250 of the second embodiment includes a first outer conductor 251 for accommodating a dielectric 30 inside, a second outer conductor 260 to be assembled with the first outer conductor 251 to cover the outer peripheries of the first outer conductor 251 and a shield body 15 of a cable 11, and the separate third outer conductor 270 arranged between the first outer conductor 251 and the dielectric 30.

The first outer conductor 251 includes a connecting tube portion 252 in the form of a rectangular tube and a first shield connecting portion 56 provided on the rear end edge of a lower side of the connecting tube portion 252.

The connecting tube portion 252 is formed to have the same diameter over the entire length in a front-rear direction. A tubular connecting portion 152 in a female outer conductor 150 of a female connector 110 is fittable into a front part of the connecting tube portion 252 as shown in FIG. 9. That is, the connecting tube portion 252 in the outer conductor 250 is formed as a large-diameter tube portion 253 having a larger diameter than the tubular connecting portion 152 in the female outer conductor 150.

The second outer conductor 260 is not described since having substantially the same configuration as the second outer conductor 60 although the shape of the covering portion 261 is partially somewhat different from that of the covering portion 61 of the first embodiment.

The third outer conductor 270 is formed into a rectangular tube shape penetrating in the front-rear direction by processing a conductive metal plate material as shown in FIG. 8. The third outer conductor 270 can be accommodated into the connecting tube portion 252 in the first outer conductor 251 from behind. As shown in FIG. 9, the third outer conductor 270 is formed to have the same diameter as the tubular connecting portion 152 in the female outer conductor 150 and the dielectric 30 can be accommodated thereinto from behind.

When the dielectric 30 is accommodated into the third outer conductor 270, a distance L21 between the third outer conductor 270 and box portions 23 in inner conductors 20 is shorter than a distance between the connecting tube portion 252 and the male connecting portions 22 and equal to a distance L2 between terminal connecting portions 122 in the female inner conductors 120 and the female outer conductor 150 as shown in FIG. 9. Therefore, in the second embodiment, the third outer conductor 270 is formed as a small-diameter tube portion 254 of the outer conductor 250.

That is, since the third outer conductor 270 constituting the small-diameter tube portion 254 is accommodated in the connecting tube portion 252 of the first outer conductor 251 constituting the large-diameter tube portion 253 in the second embodiment, the distance between the inner conductors 20 and the third outer conductor 270 can be made shorter although the female outer conductor 150 is fit in the connecting tube portion 252. In this way, the occurrence of impedance mismatching between the female and male connectors 110, 210 after the connection of the female and male connectors 110, 210 can be suppressed.

Third Embodiment

Next, a third embodiment is described with reference to FIGS. 10 and 11.

An outer conductor 350 of a male connector 310 in the third embodiment is obtained by changing the shape of the first outer conductor 51 in the first embodiment and includes a third outer conductor 370, and components, functions and effects common to the first embodiment are not described to avoid repetitive description. Further, the same reference signs are used to denote the same components as those of the first embodiment.

Figure 10:
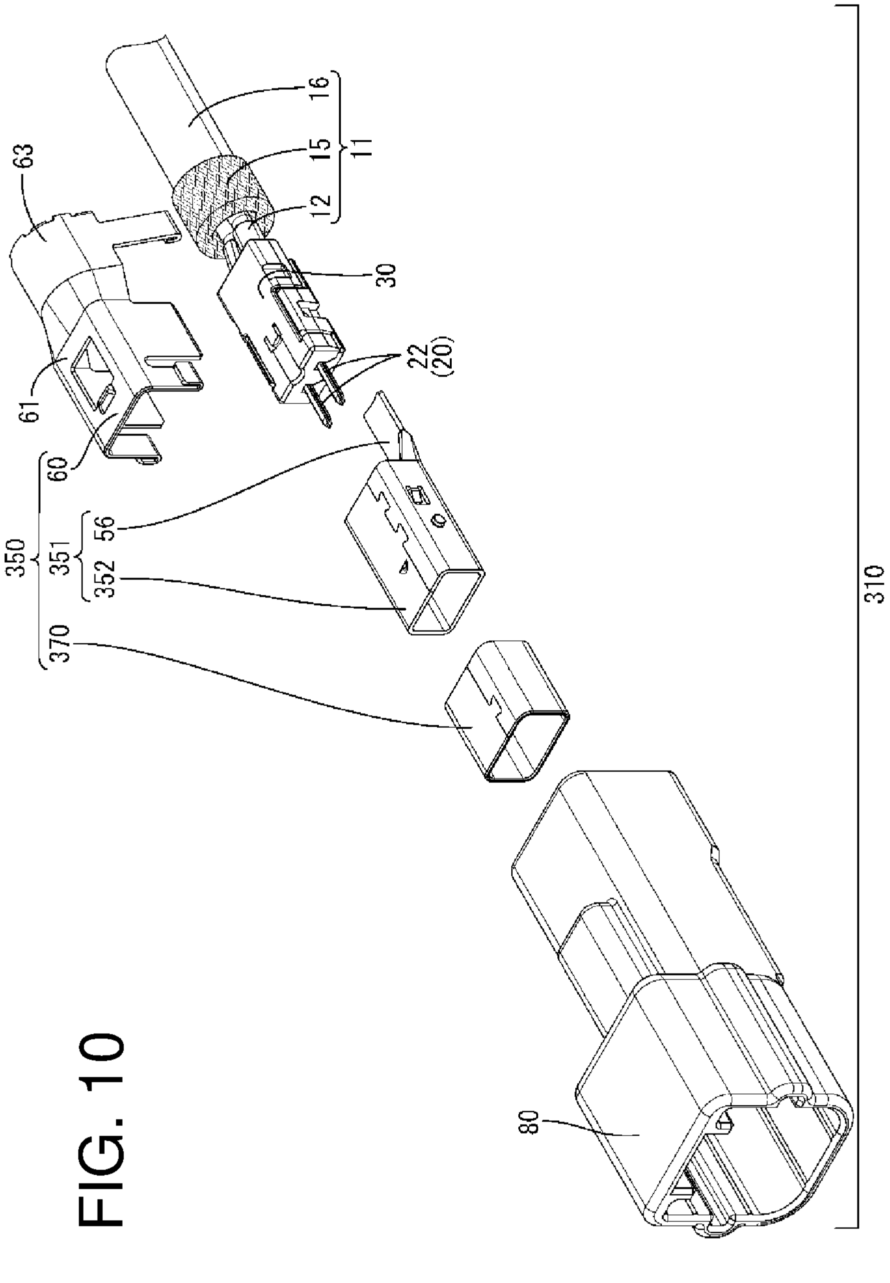
FIG. 10 is an exploded perspective view of a male connector according to a third embodiment.
Figure 11:
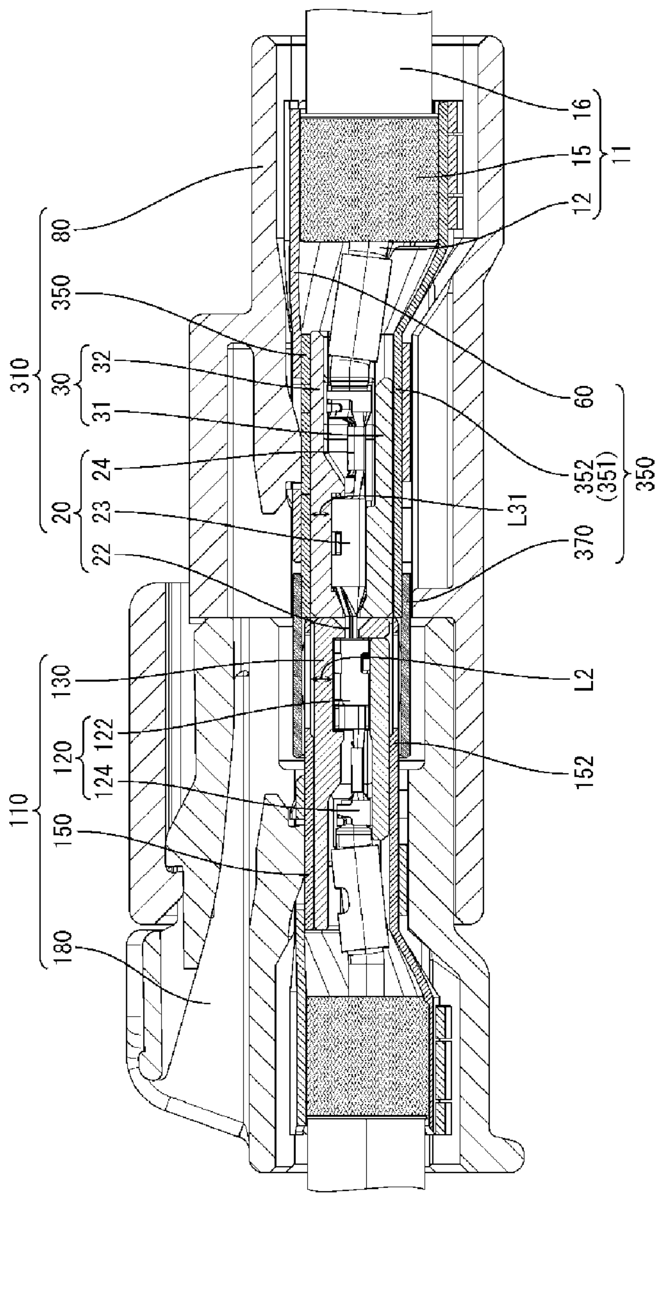
FIG. 11 is a section showing a state after the male connector and a female connector are connected.

As shown in FIGS. 10 and 11, the outer conductor 350 of the third embodiment includes a first outer conductor 351 for accommodating a dielectric 30 inside, the second outer conductor 60 in the first embodiment, and the separate third outer conductor 370 into which a front end part of the first outer conductor 251 is fit.

The first outer conductor 351 includes a connecting tube portion 352 in the form of a rectangular tube and a first shield connecting portion 56 provided on the rear end edge of a lower side of the connecting tube portion 352.

The connecting tube portion 352 is formed shorter than the connecting tube portion 52 in the first embodiment and formed to have the same diameter as a tubular connecting portion 152 in a female outer conductor 150 over the entire length in a front-rear direction. The dielectric 30 can be accommodated into the connecting tube portion 352 from behind. When the dielectric 30 is accommodated into the connecting tube portion 352, a distance L31 between the connecting tube portion 352 and box portions 23 in inner conductors 20 is equal to a distance L2 between terminal connecting portions 122 in female inner conductors 120 and the female outer conductor 150 as shown in FIG. 11. Therefore, in the third embodiment, the connecting tube portion 352 of the first outer conductor 351 is formed as a small-diameter tube portion 354 of the outer conductor 350.

The second outer conductor 60 is assembled with the first outer conductor 351 to cover the outer peripheries of the first outer conductor 351 and a shield body 15 of a cable 11.

As shown in FIG. 10, the third outer conductor 370 is formed into a rectangular tube shape penetrating in the front-rear direction by processing a conductive metal plate material. A front end part (one part) of the connecting tube portion 352 in the first outer conductor 351 is fittable into a rear end part of the third outer conductor 370 as shown in FIG. 11. On the other hand, the tubular connecting portion 152 in the female outer conductor 150 is fittable into a part of the third outer conductor 370 in front of the connecting tube portion 352. That is, the third outer conductor 370 is formed as a large-diameter tube portion 353 of the outer conductor 350.

Further, as shown in FIG. 11, the outer conductor 370 is formed to have the same diameter as the covering portion 61 of the second outer conductor 60 arranged on the outer periphery of the connecting tube portion 352.

Accordingly, if the male connector 310 and a female connector 110 are connected, the connecting tube portion 352 and the tubular connecting portion 152 of the female outer conductor 150 are butted against each other in the front-rear direction in the third outer conductor 370 of the outer conductor 350 as shown in FIG. 11.

That is, in the third embodiment, the small-diameter tube portion 354 accommodating the inner conductors 20 and the female outer conductor 150 are fit into the third outer conductor 370 of the outer conductor 350 constituting the large-diameter tube portion 353, whereby the small-diameter tube portion 354 and the female outer conductor 150 have substantially the same diameter. Specifically, the distance L31 between the inner conductors 20 and the connecting tube portion 352 and the distance L2 between terminal connecting portions 122 and the female outer conductor 150 can be made substantially equal, and the occurrence of impedance mismatching between the female and male connectors 110, 310 after the connection of the female and male connectors 110, 310 can be suppressed.

Other Embodiments

The technique disclosed in this specification is not limited to the above described and illustrated embodiments. For example, the following various modes are also included.

(1) In the above embodiments, the tubular connecting portion 152 of the female connector 110 is fit into the large-diameter tube portion 53, 253, 353 in the male connector 10, 210, 310. However, without limitation to this, a female outer conductor of a female connector may include a large-diameter tube portion and a small-diameter tube portion and an outer conductor of a male connector may be fit into the large-diameter tube portion of the female outer conductor.

(2) In the above embodiments, the male connector 10, 210, 310 is connected to the cable 11 including the two coated wires 12. However, without limitation to this, a connector may be connected to a coaxial cable in which one core is covered with insulating resin.

(3) In the above first and third embodiments, the large-diameter tube portion 53, 353 and the covering portion 61 are configured to have the same diameter. However, without limitation to this, a covering portion may be configured to have a larger or smaller diameter than a large-diameter tube portion.

LIST OF REFERENCE NUMERALS

1: connector device
10, 210, 310: male connector (example of "connector")
11: cable
12: coated wire (example of "wire")
13: core
14: insulation coating
15: shield body
16: sheath
17: sleeve
20: inner conductor
22: male connecting portion
23: box portion
24: wire connecting portion
30: dielectric
31: lower dielectric
32: upper dielectric
50, 250, 350: outer conductor
51, 251, 351: first outer conductor
52, 252, 352: connecting tube portion
53, 253, 353: large-diameter tube portion
54, 254, 354: small-diameter tube portion
55: tapered portion
56: first shield connecting portion
57: shield connecting portion
60, 260: second outer conductor
61, 261: covering portion
61A: through hole
62: linking portion
63: second shield connecting portion
64: upper plate
65: crimping piece
80: housing
82: accommodating portion
83: terminal locking portion
110: female connector (example of "mating connector")
120: female inner conductor (example of "mating inner conductor")
122: terminal connecting portion
124: wire connecting portion
130: female dielectric
150: female outer conductor (example of "mating outer conductor")
152: tubular connecting portion
153: shield connecting portion
161A: lance hole
180: female housing
182: outer conductor accommodating portion
183: locking lance
270, 370: third outer conductor

What is claimed is:

1. A connector to be connected to a mating connector while being connected to a cable in which an outer periphery of a wire covered with a shield body, comprising:
an inner conductor;
a first outer conductor; and
a second outer conductor to be assembled with the first outer conductor,
wherein:
the inner conductor is connectable to a mating inner conductor provided in the mating connector while being connected to a core of the wire,
the first outer conductor includes a large-diameter tube portion, a small-diameter tube portion, and a first shield connecting portion,
the small-diameter tube portion is disposed between the large-diameter tube portion and the first shield connecting portion and surrounds at least part of the inner conductor,
the second outer conductor includes a second shield connecting portion and a covering portion for covering an outer periphery of the small-diameter tube portion,
the second shield connecting portion is connected, together with the first shield connecting portion, to wind around the shield body,
the large-diameter tube portion is formed into a tubular shape for fitting a tubular mating outer conductor provided in the mating connector, and
the small-diameter tube portion is formed into a tubular shape having a smaller diameter than the large-diameter tube portion and continuous in a circumferential direction and accommodates the inner conductor.

2. The connector according to claim 1, wherein the small-diameter tube portion and the mating outer conductor are formed to have the same diameter.

3. The connector according to claim 1, wherein the small-diameter tube portion is connected to an end part of the large-diameter tube portion on a side opposite to the mating connector.

4. The connector according to claim 1, wherein:
the small-diameter tube portion is formed separately from the large-diameter tube portion, and
a part of the small-diameter tube portion is fit into the large-diameter tube portion.

5. A connector device, comprising:
the connector according to claim 1; and
the mating connector.

6. The connector according to claim 1, wherein the first shield connecting portion is formed to have a larger diameter than the large-diameter tube portion.

7. A connector to be connected to a mating connector while being connected to a cable in which an outer periphery of a wire covered with a shield body, comprising:
an inner conductor;
a first outer conductor; and
a second outer conductor to be assembled with the first outer conductor,
wherein:
the inner conductor is connectable to a mating inner conductor provided in the mating connector while being connected to a core of the wire,
the first outer conductor includes a large-diameter tube portion, a small-diameter tube portion, and a first shield connecting portion,
the second outer conductor includes a second shield connecting portion and a covering portion for covering an outer periphery of the small-diameter tube portion,
the second shield connecting portion is connected, together with the first shield connecting portion, to wind around the shield body,
the large-diameter tube portion is formed into a tubular shape for fitting a tubular mating outer conductor provided in the mating connector,
the small-diameter tube portion is formed into a tubular shape having a smaller diameter than the large-diameter tube portion and continuous in a circumferential direction and accommodates the inner conductor, and the small-diameter tube portion is formed separately from the large-diameter tube portion and arranged in the large-diameter tube portion.

8. The connector according to claim 7, wherein a part of the small-diameter tube portion is fit into the large-diameter tube portion.

* * * * *